(12) United States Patent
Berkowitz et al.

(10) Patent No.: US 9,191,517 B2
(45) Date of Patent: Nov. 17, 2015

(54) COMMUNICATION SERVICES AND APPLICATION LAUNCH TOOL

(75) Inventors: Brett Berkowitz, New York, NY (US); Gopi Krishna Kancharla, Milford, CT (US); Ravi K. Vankayala, Milford, CT (US); Carlos J. Gómez de Llarena, New York, NY (US); Ryan Rowe, Shanghai (CN); Joseph A. Parker, III, Wallingford, CT (US)

(73) Assignee: IPC SYSTEMS, INC., Jersey City, NJ (US)

( * ) Notice: Subject to any disclaimer, the term of this patent is extended or adjusted under 35 U.S.C. 154(b) by 346 days.

(21) Appl. No.: 12/953,778

(22) Filed: Nov. 24, 2010

(65) Prior Publication Data

US 2012/0131089 A1     May 24, 2012

(51) Int. Cl.
*G06F 15/16* (2006.01)
*H04M 7/00* (2006.01)
*H04L 12/58* (2006.01)
*H04M 3/42* (2006.01)
*H04M 3/493* (2006.01)

(52) U.S. Cl.
CPC ........... *H04M 7/0024* (2013.01); *H04L 51/066* (2013.01); *H04L 51/18* (2013.01); *H04M 3/42323* (2013.01); *H04M 3/42229* (2013.01); *H04M 3/42365* (2013.01); *H04M 3/493* (2013.01)

(58) Field of Classification Search
None
See application file for complete search history.

(56) References Cited

U.S. PATENT DOCUMENTS

| 6,976,017 | B1 | 12/2005 | Getchius ........................... 707/3 |
| 8,005,897 | B1 * | 8/2011 | Roka et al. .................... 709/205 |
| 8,416,928 | B2 * | 4/2013 | Ramamoorthy et al. .. 379/88.16 |
| 2003/0084343 | A1 * | 5/2003 | Ramachandran et al. .... 713/201 |
| 2004/0205175 | A1 | 10/2004 | Kammerer .................... 709/223 |
| 2005/0165914 | A1 * | 7/2005 | Moore et al. ................. 709/219 |
| 2007/0038604 | A1 * | 2/2007 | Stienhans ......................... 707/3 |
| 2007/0087769 | A1 * | 4/2007 | Takahashi et al. ............ 455/518 |
| 2008/0298561 | A1 * | 12/2008 | Hwang et al. .............. 379/88.17 |

FOREIGN PATENT DOCUMENTS

EP     2 252 040 A1     11/2010

OTHER PUBLICATIONS

International Search Report and Written Opinion of the International Searching Authority for International Patent Application No. PCT/US2011/060139, Feb. 17, 2012 (11 pages).

* cited by examiner

*Primary Examiner* — Scott B Christensen
(74) *Attorney, Agent, or Firm* — Fitzpatrick, Cella, Harper & Scinto (57) ABSTRACT

Resources in a communication system are associated based on a query by receiving the query from a client device, generating requests based on the query, each request being formatted in a different message format, transmitting each of the plurality of requests to at least one corresponding source, and receiving at least one result associated with the query from the at least one corresponding source, where each result is associated with a communications application.

18 Claims, 7 Drawing Sheets

COMMUNICATION SERVICES AND APPLICATION LAUNCH TOOL

BACKGROUND

1. Field

Example aspects of the present invention generally relate to communication systems and more particularly to products for providing a query and launch tool for communications system.

2. Related Art

A turret system is a specialized key telephony switching system that allows a relatively small number of users to access a large number of external lines and provides enhanced communication features such as hoot-n-holler, push-to-talk, intercom, video, and large-scale conferencing. These features are often utilized in the financial industry such as trading floor environments, as well as security/law enforcement, public safety utilities, healthcare, and customer support (e.g., contact centers) environments.

Users interface with a turret system through a turret device, which is a phone-like desktop device with multiple handsets and speakers and multiple buttons. A turret is either implemented in dedicated hardware (sometimes referred to as a "hard" turret) or a general-purpose computer (sometimes referred to as a "soft" turret).

Turret devices can reside in a fixed environment of dedicated voice communications trading resources or a more virtualized trading environment across multiple sites. A virtual environment allows resources to be shared dynamically, when and where required, across a global corporate enterprise.

Typical global corporate enterprises lack mechanisms for querying, sharing and organizing information related to communications resources and infrastructure. Search engines, for example, are not designed to identify and organize resources across a communications system. A search engine searches for information on a network and presents the search results in a list where each identified resource is associated with a uniform resource locator (URL) that specifies where the identified resource is available. The mechanism for retrieving the content is typically defined by the file pointed to by the URL (e.g., by the extension of the file, .docx, .html, .mp3, and the like). The content may consist of web pages, images, information and other types of files. Depending on the type of resource pointed to by the URL, the appropriate program is launched. For example an image pointed to by the URL causes a computer to launch an image viewer, a document-type file causes an appropriate word processing document to launch, etc.

Applications such as e-mail and contact applications allow users to search for e-mails and contacts based on a query term. E-mails can be queried by sender, recipients, subject, and the like. Similarly, a local or global contact database can be searched for a particular contact or group and, in some cases, the same application that runs the search can execute a service such as make a call or prepare and e-mail to the contact or group.

What is needed is a communications resource tool that initiates queries of several remote sources based on a single query, associates the results and provides communications-related resources related to the results so as to allow associated communication system applications to be quickly and easily executed.

BRIEF DESCRIPTION

The example embodiments described herein meet the above-identified needs by providing methods, systems and computer program products for providing a query and program launch tool specialized for use in a communications infrastructure.

In one aspect of the present invention, methods, computer-readable medium and apparatus are provided for associating resources in a communication system based on a query by receiving the query from a client device, generating requests based on the query, each request being formatted in a different message format, transmitting each of the plurality of requests to at least one corresponding source, and receiving at least one result associated with the query from the at least one corresponding source, where each result is associated with a communications application.

Further features and advantages, as well as the structure and operation, of various example embodiments of the present invention are described in detail below with reference to the accompanying drawings.

BRIEF DESCRIPTION OF THE DRAWINGS

The features and advantages of the example embodiments of the invention presented herein will become more apparent from the detailed description set forth below when taken in conjunction with the following drawings.

DETAILED DESCRIPTION

The example embodiments presented herein are directed to methods, systems and computer program products for associating resources located on multiple sources and executing application and/or services within a communications system which are now described herein in terms of an example trading environment. This is for convenience only and is not intended to limit the application of the present disclosure. In fact, after reading the following description, it will be apparent to one skilled in the relevant art(s) how to implement alternative embodiments, such as security/law enforcement, utilities, healthcare, and customer support (e.g., contact centers) environments.

Generally, a tool provides a search window into which the user can type search criteria text in order to search for some feature or an entry list accessible via a unified desktop application ("UDA"). The user may type in any alphanumeric character into the window to search for a UDA function or feature. Features that are searchable include (but are not limited to): a contact management application, forums, communication history, favorites, a speaker application, call control, voice services, and click to dial. The user may select any of the result entries presented through a user interface and then launch an "actions" window, which presents all viable and logical actions for that entry.

Figure 1:
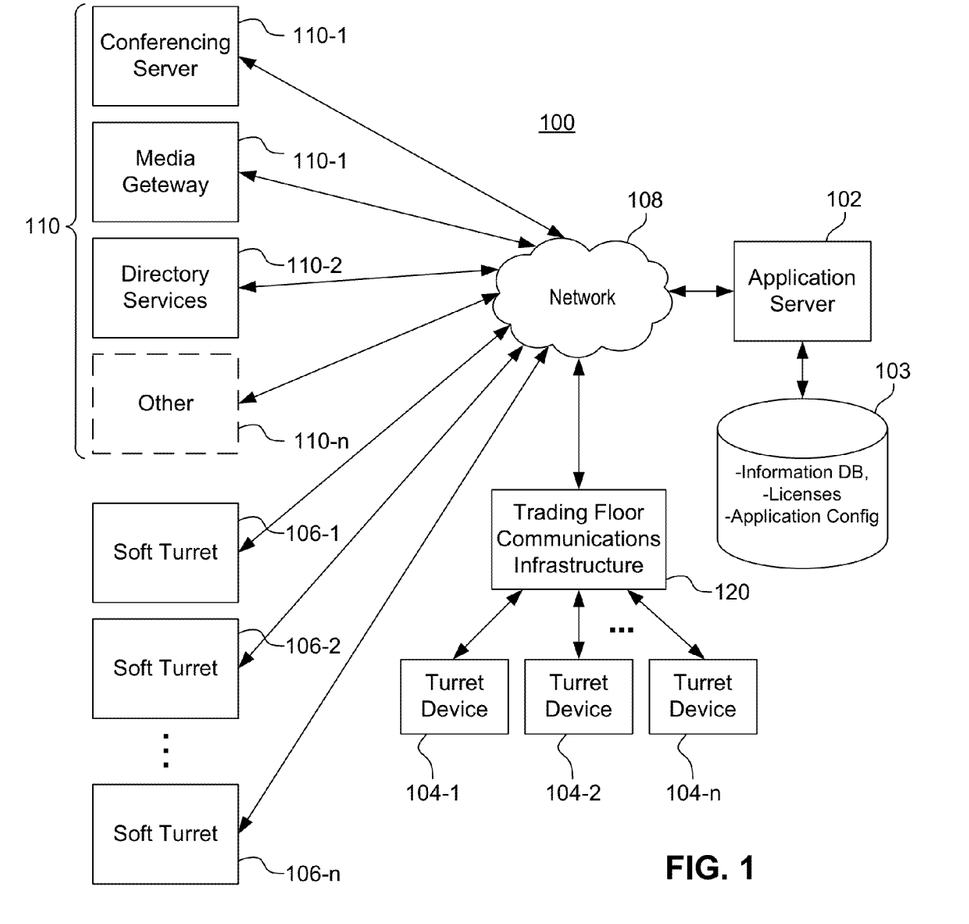
FIG. 1 is a representative diagram of a communication system with an application server and several sources of information and resources communicating via a local or wide area network in which embodiments of the present invention may be employed.

FIG. 1 is a representative diagram of a communication system 100 including an application server 102 and several sources of information and resources 110-1, 110-2, 110-3, . . . , 110-n (referred to collectively as sources 110) communicating via a local or wide area network 108 in which embodiments of the present invention may be employed. Communications system 100 also includes a trading floor communications infrastructure 120 coupled to turret devices 104-1, 104-2, . . . , 104-n (collectively and individually referred to as 104). Communication system 100 also includes soft turrets 106-1, 106-2, . . . , 106-n (collectively and individually referred to as 106).

The trading floor communication infrastructure 120, turret devices 104, soft turrets 106, sources 110 and application server 102 are all interconnected via a network 108, which may be a private or public network, or combination of both.

Application server 102 is responsible for receiving a query via the user interface of a soft turret 106 or turret device 104. Application server 102, alone or in combination with a device such as turret device 104 is also responsible for processing the query. The query is formatted into the formats accepted by sources 110 by generating packet messages including the query. The messages are then communicated to the appropriate source 110. Each source 110, in turn, performs an independent search of its database and returns results based on the query to the requestor. Application server 102 organizes and formats the results returned by sources 110 for presentation via the output interfaces of turrets 104, 106 and provides a mechanism to launch communications-related applications associated with the types of results. In one embodiment, a local personal computer (PC) desktop, for example, obtains the relevant information from application server 102. When a user initiates a search request, the information saved in memory on the PC desktop is searched.

One type of resource is a conference server 110-1. Conference server 110-1 combines audio streams to provide voice and/or video conferencing services. For example, if users A and B are communicating through audio stream 1 and users Y and Z are communicating through audio stream 2, conference server 110-1 provides a mechanism to bridge audio streams 1 and 2 to create a conference call between users A, B, Y and Z. Another service is provided by a media gateway 110-2. Media gateway 110-2 connects the communications network 108 to other networks such as a public switched telephone network (PSTN). Another resource is directory resource 110-3, which provides global directory information such as contact information.

An application server database 103 coupled to application server 102 maintains application configurations and other information, such as contacts, functions, named entities, and application licenses.

Application server 102 communicates with sources 110 using the appropriate protocols. The Lightweight Directory Access Protocol (LDAP) application protocol, for example, can be used for querying and modifying data of directory services implemented in Internet Protocol (IP) networks. Structured Query Language (SQL) can be used to obtain data from relational database management systems (RDBMS). Other protocols may used to query or modify data in sources 110 as well, such as Messaging Application Programming Interface (MAPI), Java Naming and Directory Interface (JNDI), and the like. The results are collected by the application server 102 and returned to the user interfaces on the soft turret 106 or turret device 104.

Figure 2:
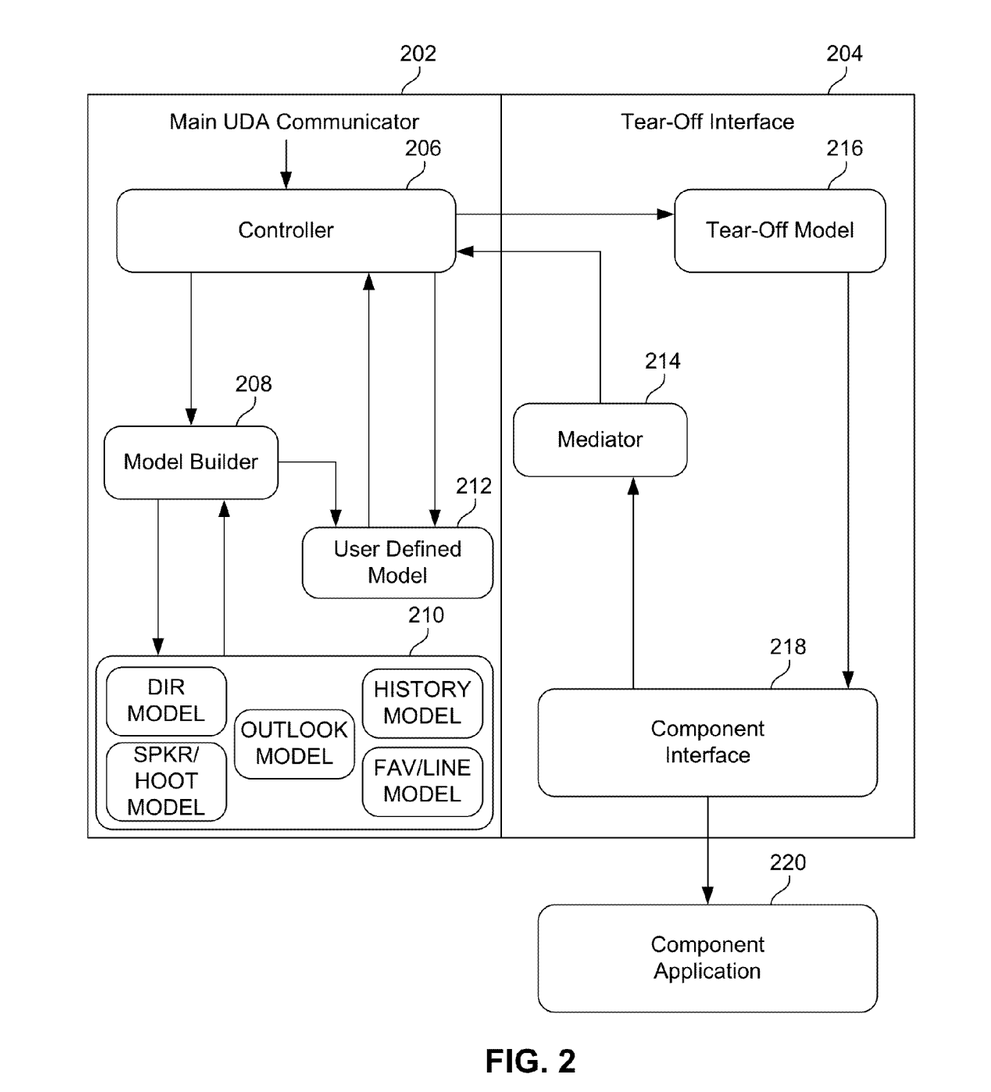
FIG. 2 is a collaboration diagram of functional modules deployed on a computer system for associating resources located on multiple sources and executing services within a communications system in accordance with an embodiment of the present invention.

FIG. 2 is a collaboration diagram of functional modules deployed on a computer system for associating resources located on multiple sources and executing services within a communications system in accordance with an embodiment of the present invention. In one embodiment, these modules are executed by application server 102 (FIG. 1). The functional modules represent a main unified desktop application (UDA) communicator 202 and a tear-off interface 204. The UDA communicator application 202 provides connectivity to enterprise applications in communications system 100 (FIG. 1) that software agents access. The tear-off interface 204 is an on-demand interface which is created/instantiated when a client device such as turret 104/106 performs a query.

As shown in FIG. 2 the main UDA communicator application 202 includes a controller 206, a model builder 208 and a UDA model database 210. Controller 206 instructs model builder 208 to build a user defined model 212 based on logon information and prestored models stored in UDA model database 210. In one embodiment, the extent of actions available to the user is controlled by a license engine and the user's role as defined by user management. For example, if a user is not licensed to use communication history, then the action list would not include "View History".

User defined model 212 is an aggregate of licensed models stored in UDA model database 210 for which the logged on user has permission. The prestored models correspond to various UDA applications, where each individual model stored in UDA model database 210 is a collection itself. User defined model 212 is thus an array of collections.

Tear-off interface 204 includes a component interface 218 and a mediator 214. Component interface 218 is a user interface which accepts input from a user to perform a query and, in turn, display query results. In addition, component interface 218 accepts input from the user to launch a component application 220.

Mediator 214 is the interface between component interface 218 and main UDA communicator application 202, particularly via controller 206. Mediator 214 receives messages from component interface 218 and modifies them into a format parseable by controller 206. Mediator 214 need not wait for the entire query term to be entered. As query text is entered mediator 214 intercepts, formats and forwards it to controller 206. Thus, mediator 214 provides a cumulative-results search. As each character is entered into the window, the results matching the cumulative total characters entered thus far are displayed. As more characters are entered, the search criteria are refined and the search results adjusted to match.

Tear-off model 216 corresponds to user-defined model 212. Particularly, when user defined model 212 is pushed to the tear-off interface 204 the data are saved on the local device in its local memory as tear-off model 216.

Figure 3:
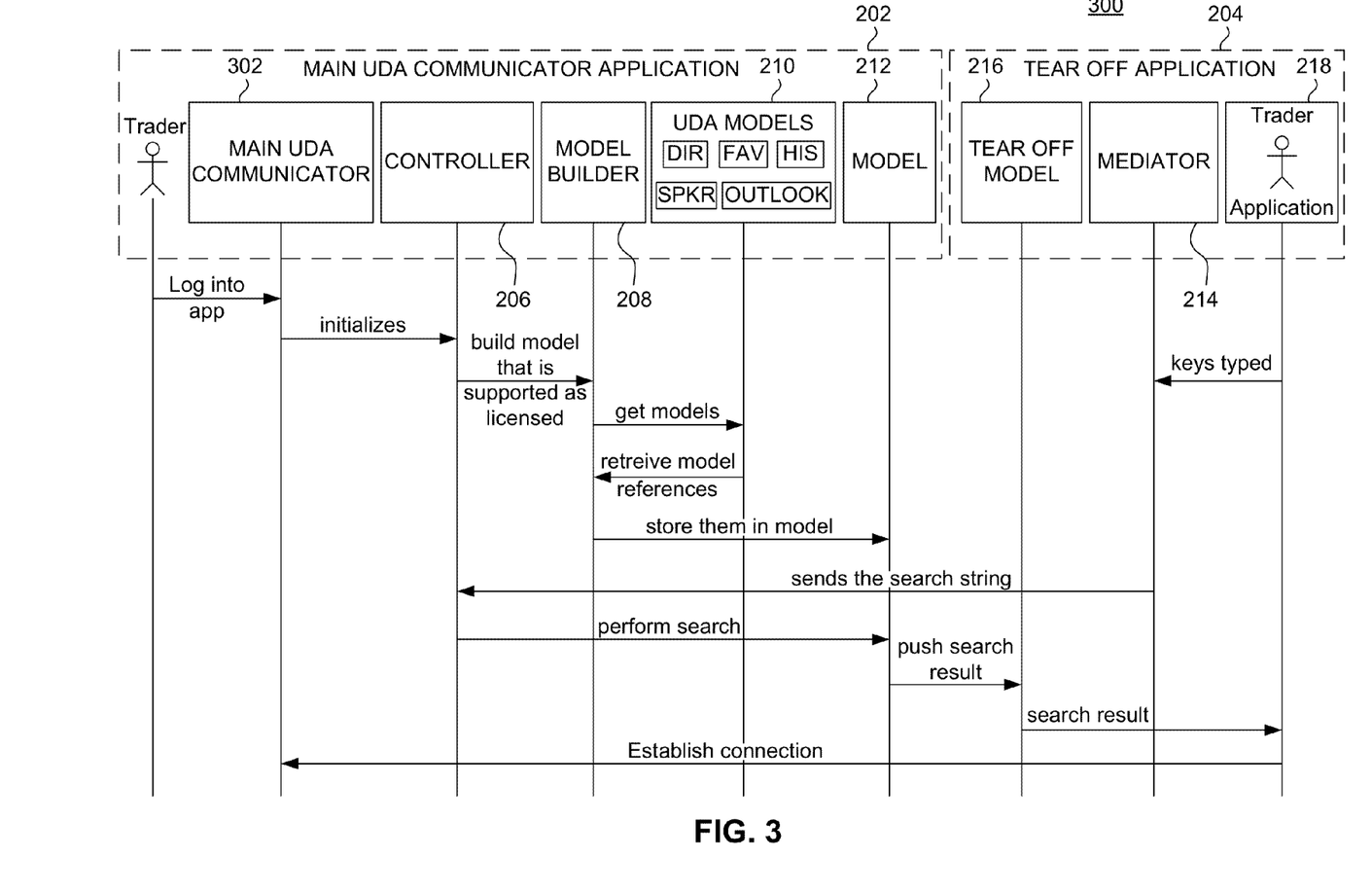
FIG. 3 depicts a sequence diagram for associating resources located on multiple sources and executing services within a communications system in accordance with an example embodiment of the present invention.

FIG. 3 depicts a sequence diagram 300 for associating resources located on multiple sources and executing services within a communications system in accordance with an example embodiment of the present invention. A main UDA communicator application 202 is executed by a processor (not shown). After a user logs into the main UDA communicator application 202 via a user interface 302 referred to as main UDA communicator 302, main UDA communicator 302 causes controller 206 to initialize based on a configuration associated with the user that has logged onto the main UDA communicator application 202.

Controller 206, in turn, instruct model builder 208 to build a combined model from a database of UDA models 210. Particularly, controller 206 requests model builder 208 to obtain licensed models from UDA model database 210. The retrieved models available to the user are stored in memory as a user defined model 212.

The search domain is governed by license and role-based access control (RBAC) to restrict system access to authorized users. The extent of a user's ability to search lists (such as contact lists) and features is controlled by licenses stored in database 103 (FIG. 1) or other application or database server, and the user's role as defined in the user management. For example, if a user is not licensed to use PSTN voice services, then their search will not include any PSTN dial tone point of contact entries. Additionally, if a user is not licensed to use the speaker, then "Speaker Application" would not appear as a result of a search.

Figure 5:
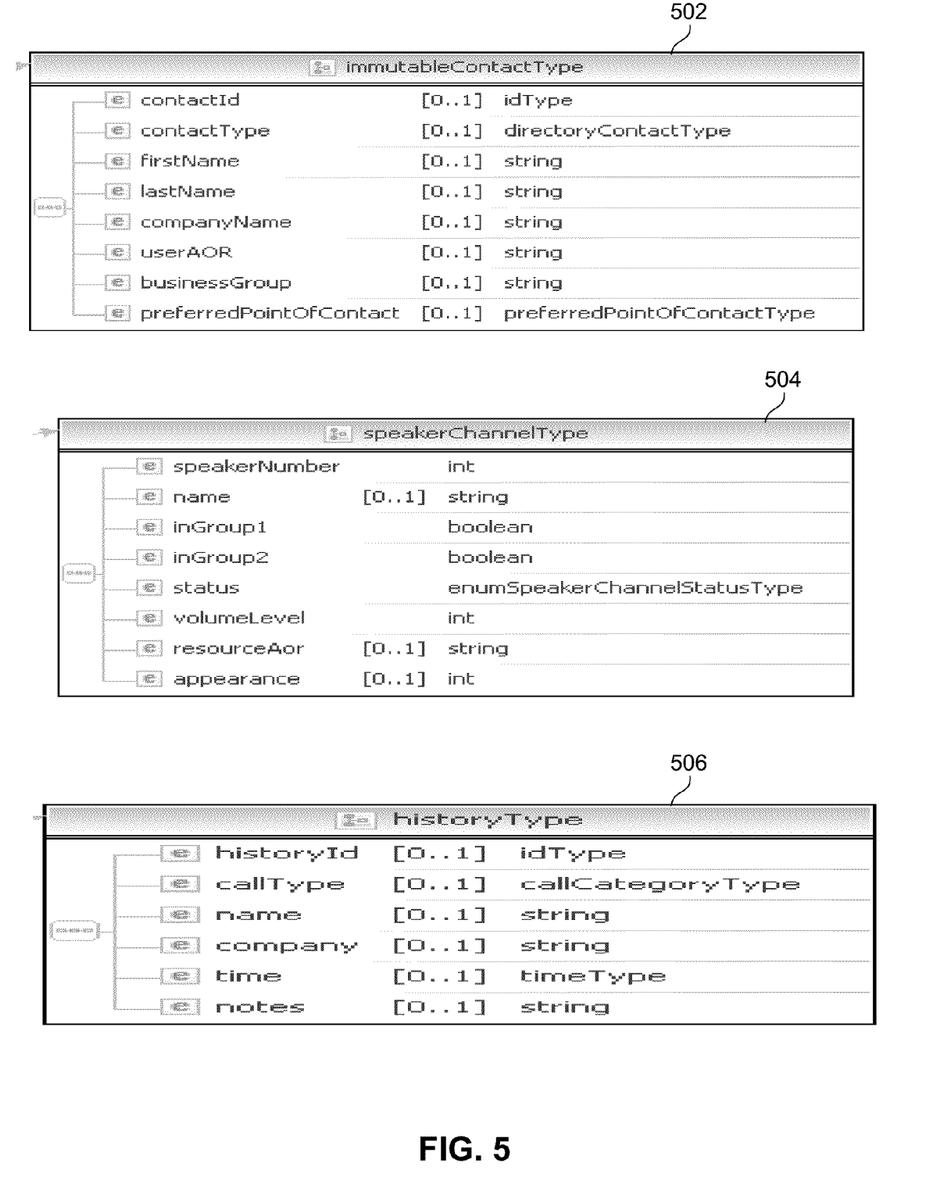
FIGS. 5 and 6 illustrate exemplary models in accordance with an embodiment of the present invention.
Figure 6:
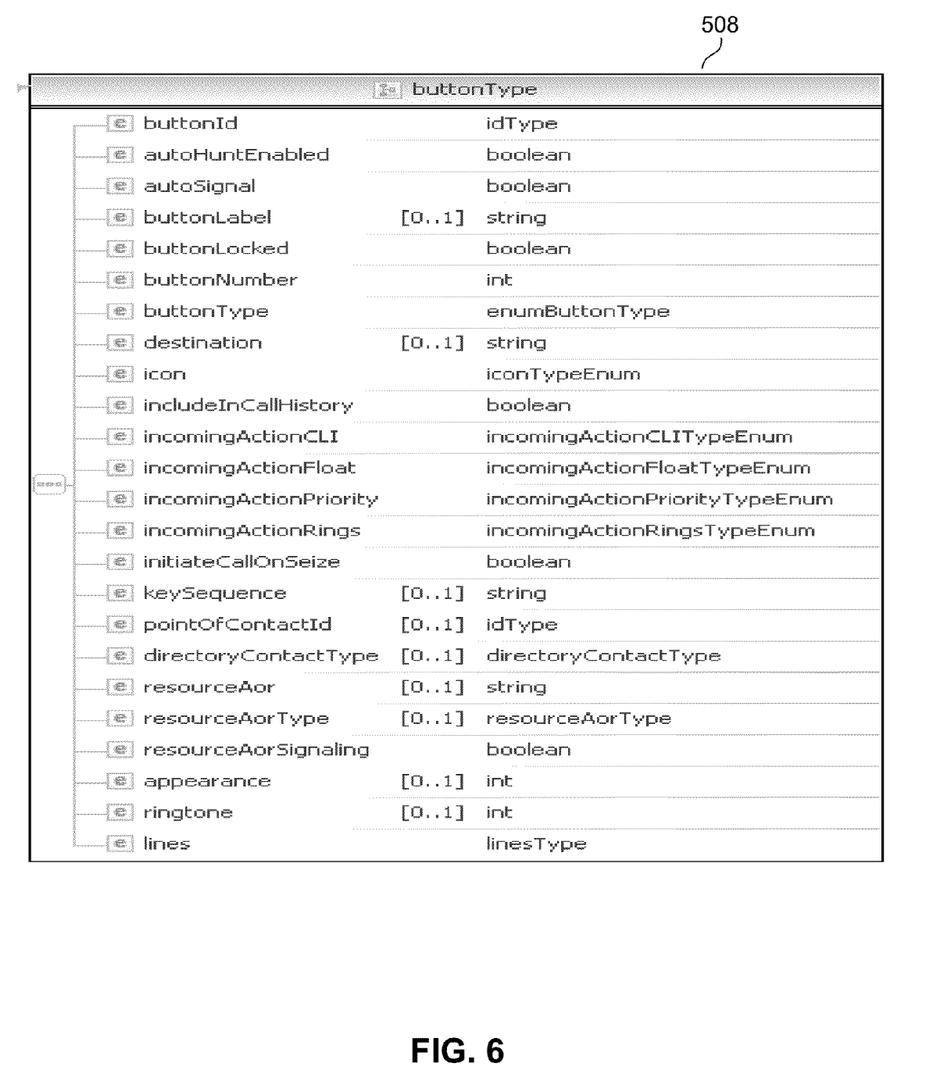

FIGS. 5 and 6 illustrate four exemplary models stored in UDA model database 210. Contacts model 502 illustrates attributes associated with a contacts directory model. In this example, data related to contacts are organized based on directoryContactType which distinguishes a contact stored in a global database from a local contact database. Speaker model 504 illustrates attributes associated with hoots and speakers (e.g., private wires) that are used for broadcasts (e.g., two-way broadcasts). History model 506 illustrates attributes associated with call records. Favorites model 508 illustrates attributes associated with users button sheet data. A favorites database (e.g., internal to a turret or UDA) allows users to organize counterparty access points as well as program macros that programmatically execute a sequence of commands to establish a communication path. An example of such macro would include the sequence of commands necessary to call into a bank's automated directory service and then locating and calling a particular counterparty. The macro dials a main switch board number and then subsequently dials the extension of the sought after counterparty. Another exemplary macro can be programmed to associate a different ring tone or number of rings, and the like, to a particular counterparty.

Thus, by aggregating the contacts model 502 and favorites model 508, for example, a search for a particular term will associate records, records that otherwise would have been unassociated and require separate searches using different search means. In this example, a search for a particular person or entity would not only return that person or entity's contact information, it would also present available macros available for that person or entity and present both to the requesting user through a user interface on a single results page, organized to provide easy access to information and selection of functions associated the particular result selected by the user.

Public and private line communications systems execute applications which generate both transitory and persistent data. Transitory (short term or temporary) data are those data that remain alive only for a relatively short time period, typically not surviving the activation or execution of an application, such as the instantiation of a call session, whereas persistent (or long term) data are those data that are stored in a storage architecture for long-term, reliable retention, such as a contact which will be accessed after a call session has ended. The data stored in records corresponding to these models may include both transient and persistent data. This permits queries to return current information such as whether a trader is currently on a call, forum or conference as well as persistent data such as contact information, call history information, and the like.

A user defined model 212 is an array collection (i.e., ordered list) of individual records obtained from different entities such as a speaker server, a directory server, an Outlook server, a history server and a faxline server. The user has the ability to select a mode which identifies the particular models to use to build the user defined model 212. For example, in one mode, a user defined model contains data records corresponding to exemplary models, contacts model 502, speaker model 504, history model 506, favorites model 508, as shown in FIGS. 5 and 6. In another mode a user defined model will contain only the records corresponding to, for example contacts model 502 and speaker model 504. Accordingly, by aggregating two or more models stored in UDA model database 210, searches across all the horizontal layers of the models can be performed.

Tear-off interface 204 initiates a database query based on the user defined model as a user begins to enter a query through a component interface 218 (e.g., "trader application"). As the user keys in a query, mediator 214 collects the keystrokes and communicates them to controller 206. Controller 206, in turn, performs a search of various application databases based on the user defined model 212. In another embodiment, controller 206 commands applications to provide a current status of communications activity such as active call sessions, forums and conferences, speaker activity (e.g., "hoot-n-holler"), call volume, and the like.

A "conference" can be an ad hoc conference that is uncontrolled, where a user initiates a conference call with other parties to initiate the conference. A "forum" allows a user to preconfigure a conference call. In one embodiment, the component interface includes who is on the conference and a moderator will have control over the "forum". A forum has a name and the name is searchable.

Statistics such as the call history of a caller or line number, including information regarding whether the call was forwarded, to where it was forwarded, and whether and when other lines joined the call. The particular attributes of a call session (e.g., caller identifier, time caller joined or dropped from the call) can also be provided via a graphical interface.

The results are then sent to tear-off model which, in turn, communicates the results to the user through component interface 218. The results provided to the user include, but are not limited to, a directory service, a favorites service, a history service, a speaker service (e.g., hoot-n-holler, push-to-talk, intercom, etc.) and an outlook service, each of which has a corresponding model.

Each model stored in UDA model database 210 has one or more attributes associated with a corresponding source of information and which are used for associating related results. For example, one model may have an attribute that defines its corresponding application as a directory service. Another model may have an attribute that defines its corresponding application as a speaker application.

An attribute may be common to the models, such as a contact name attribute. If the user defined model includes fields associated with sources or application resources that have information the fields of user defined model will be populated with the information and returned by controller 206 to component interface 218, as shown in FIGS. 2 and 3. Component interface 218, in turn, presents the results to a user via a user interface in an organized manner so as to easily identify applications associated with the results.

The results can be presented in a hierarchical manner where a result such as a contact name, is presented, and then related results (e.g., licensed applications) are listed after the result is selected. Alternatively, the results can be presented based on the applications which can be executed, where the input to those applications is based on a data item (or query term) common to all the sources that provide a response to the query. For example, if the name "Ben" is input as the query term, the results from the sources might be application identifiers capable of performing a communications function associated with "Ben". If, for example, someone named "Ben" is on a conference call and has a hoot-n-holler service, one of the application sources (e.g., conferencing server 110-1) will return data permitting the user who performed the search the ability to launch an application that joins the user to the conference Ben is participating in. Similarly, another application source will return data permitting the user to launch a hoot-n-holler speaker function to instantly connect to "Ben". The possible applications are listed on a user interface with an indication that they are all in some way associated with the query term, in this example "Ben".

The search results can then be used to establish a communications connection associated with a particular result the user selects through component interface 218.

Each UDA model stored in UDA model database 210 includes an attribute which is used to identify an associated application. The user defined model 212 formed by model builder 208 includes this attribute. As shown in FIG. 1, for example, directoryContactType has different values to indicate whether the contact information stored in this collection is from a users global contacts database or a user's local e-mail contact database. Similarly, as shown in FIG. 3, callCategoryType has different values to indicate whether a record is from missed, received, or initiated calls.

When query results corresponding to the user defined model 212 are communicated to the user via component interface 218, indicators such as predefined icons corresponding to the associated applications are displayed.

A user can select from the component interface 218 a component application 220 to launch by, for example, selecting an icon corresponding to an application associated with a particular query result. The component application 220 is then launched based on the attribute associated with the selection.

In one embodiment, a dynamic sizing results window is provided. The results window dynamically lengthens or shortens as the results of the search change. The default maximum number of results that appear in the result window is, for example, ten (10), but this is customizable by the user. Results that are available but are not shown within the results window can be viewed via a scroll bar which allows the user to scroll up and down through the search results.

The results are selectable by mouse, where each result shown in the result window can be selected by, for example, a mouse left click. Upon selecting the entry, a list of actions is presented. Similarly, the results are selectable by a keyboard, where each result shown in the result window can be selected by use of the keyboard cursor keys (traversing up and down the list of results). Upon selecting the entry and hitting ENTER, a list of actions is presented.

In one embodiment, a result shown at the head of the results window is highlighted by default. The highlighted result can be selected by pressing the ENTER key. Upon pressing the ENTER key, a list of actions is presented.

Similarly, in another aspect, an action listed at the top of the results list is launched by selecting the enter key. Particularly, the result shown at the head of the actions window is highlighted by default and thus can be selected by pressing the ENTER key. Upon selecting the entry, the chosen action is performed.

In yet another aspect, an action list is provided. After selecting an entry within the results window, a list of actions is presented. The list of actions presented are those that are logically available based upon the type of object selected and the various records associated with that object. For example, if a contact entry is selected, then the actions that could be available would be: Call, View Contact Record, View Related History, Add to favorites, Add to Hot list, etc.

In yet another embodiment, an icon or result representing a communications function can be selected or "double-clicked" to launch a call associated with data obtained from an information sources or application resource. If a CONTACT entry from within the results window is selected and then the left button is selected or "double clicked", for example, a call to the counter party is launched. Thus the double left click in effect is a short cut to placing an outbound call to a contact.

Each result shown in the action window can be selected by a mouse. Upon selecting the entry, the chosen action is performed. For example, if "Call" is selected, then the UDA initiates a communication session to the target counter party.

In addition to the text entry window, a number of short cut icon buttons can be embedded within the toolbar window which allow a user to launch a particular UDA feature. Features that may be included within the short cut buttons may include a contact management application, forums, communication history, favorites, speaker application, call control, voice services, click to dial, and the like. Upon clicking the left mouse button on top of one of the buttons, the associated UDA function is launched (provided the user has sufficient access).

Figure 4:
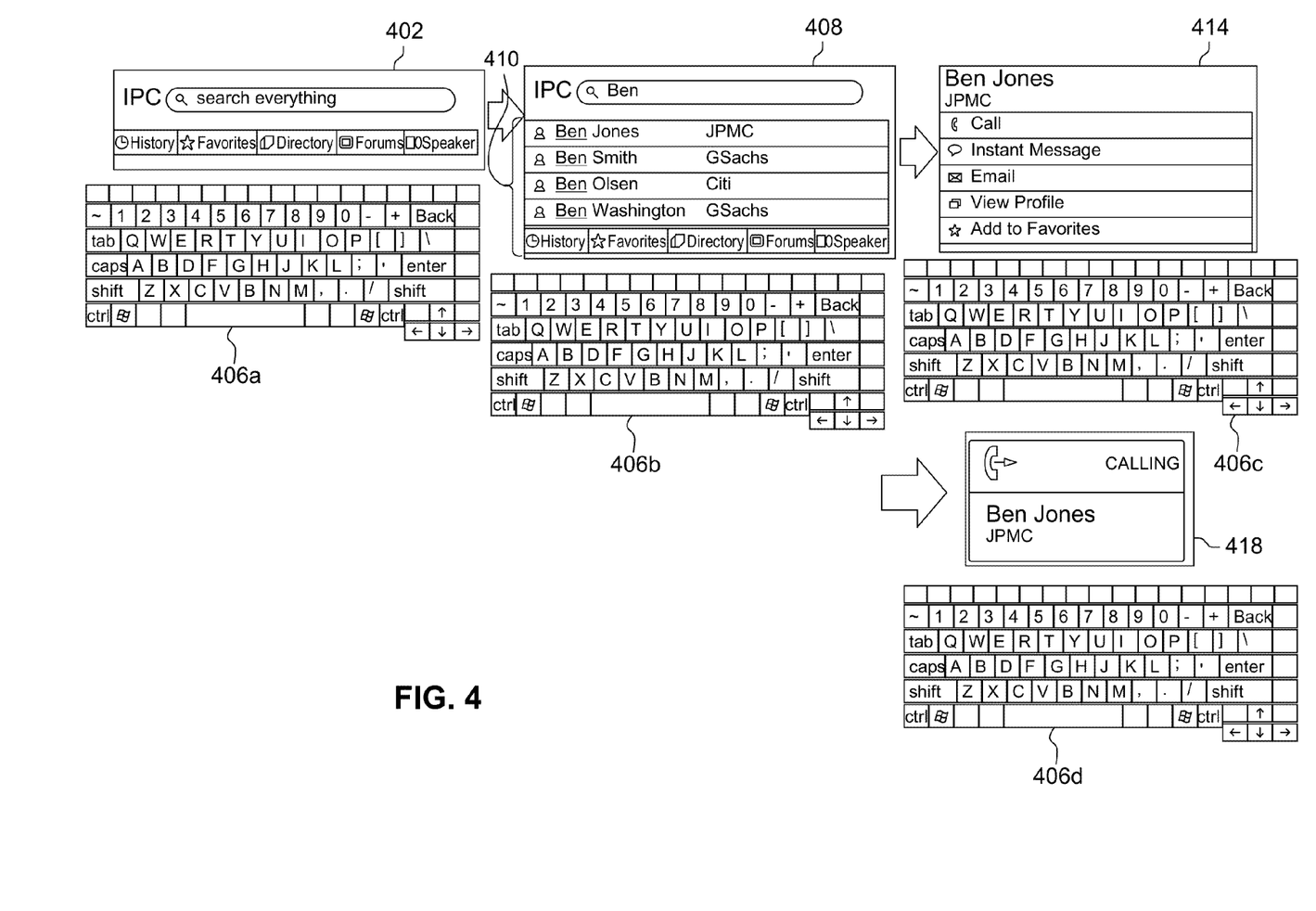
FIG. 4 illustrates example windows or screen shots generated by the graphical user interface for performing a query and associating related resources located on multiple sources and executing services within a communications system in accordance with an embodiment of the present invention.

FIG. 4 illustrates example windows or screen shots generated by the graphical user interface for performing a query, associating related resources located on multiple sources and executing services within a communications system in accordance with an embodiment of the present invention. The graphical user interface is incorporated, for example, as component interface 218 in FIG. 2. The initial tool bar 402 is presented via component interface 218 on a client device (e.g., turret 104, 106). In addition to the text search window, there are a number of short cut icon buttons embedded within the toolbar window which allow a user to launch a particular UDA feature, such as History, Favorites, Directory, Forums, and Speaker. Upon selecting a button, the associated UDA function is launched. Accordingly, if no query has been entered and an icon button is selected the corresponding UDA function will be launched in its default state.

When the interface receives a keyword search as shown in screen shot 408, packet messages are generated for all the licensed sources 110 (FIG. 1) associated with the logged in user. For example, an entry of the name, "Ben" will cause the application to generate messages to all available sources 110 to perform a search associated with "Ben" to be communicated to controller 206 (FIGS. 2 and 3) to query sources 110 for information and resources. The results will be pushed back to the tear-off interface 204, particularly to tear-off model 216.

As shown in screen shot 408 of FIG. 4, a search for the term "Ben" returns several results associated with that name. In this case the results are various contacts associated with various persons having the same name "Ben". The results also can include one or more communications applications associated with contacts having the name "Ben". For example, one item in the list can include a name (e.g., "Ben"), a status ("on conference") and one or more possible actions (e.g., "Join Conference") that would, if selected, execute the appropriate application in the communications system.

Referring back to the example in FIG. 4, as shown in screen shot 414, Ben Jones was selected in screen 408. Upon selection, a list of possible applications/services are presented via the graphical user interface. In this example, applications that are licensed to the user who logged onto the UDA and are also associated with the selection (i.e., "Ben Jones") are presented. In the example shown in FIG. 4, the user has selected "Call". Accordingly, as shown in screen shot 418, a dialer application is launched and the appropriate record associated with the contact is used to obtain the contact's line number and the line number is sent to the dialer application, which in turn makes the call.

Other applications, such as conference or forum could also have been listed in screen 408 and 414.

In another aspect of the present invention, a mechanism of using a press key combination via a keyboard 406a-d is provided to enter a query string or launch an application. For example, when the interface receives the entry "$" it causes controller 206 to generate a message requesting a forum server (not shown) or corresponding application to search for all forums. As a result, all forums are displayed in the format "$ Forum". Thus, in this embodiment, there is no need to type a word such as "conference" or "forum".

If the user interface receives the entry "conference", the application generates a message formatted for the conference server, which in turn causes the conference server to search for a range of conferences that are pending. In another aspect, the system returns corresponding conference and forum states.

The example embodiments described above such as, for example, system 100, functional modules 200, procedure 300, graphical user interface 400 or any part(s) or function(s) thereof, may be implemented in one or more computer systems or other processing systems. Useful machines for performing the operation of the example embodiments presented herein include general purpose digital computers or similar devices.

Figure 7:
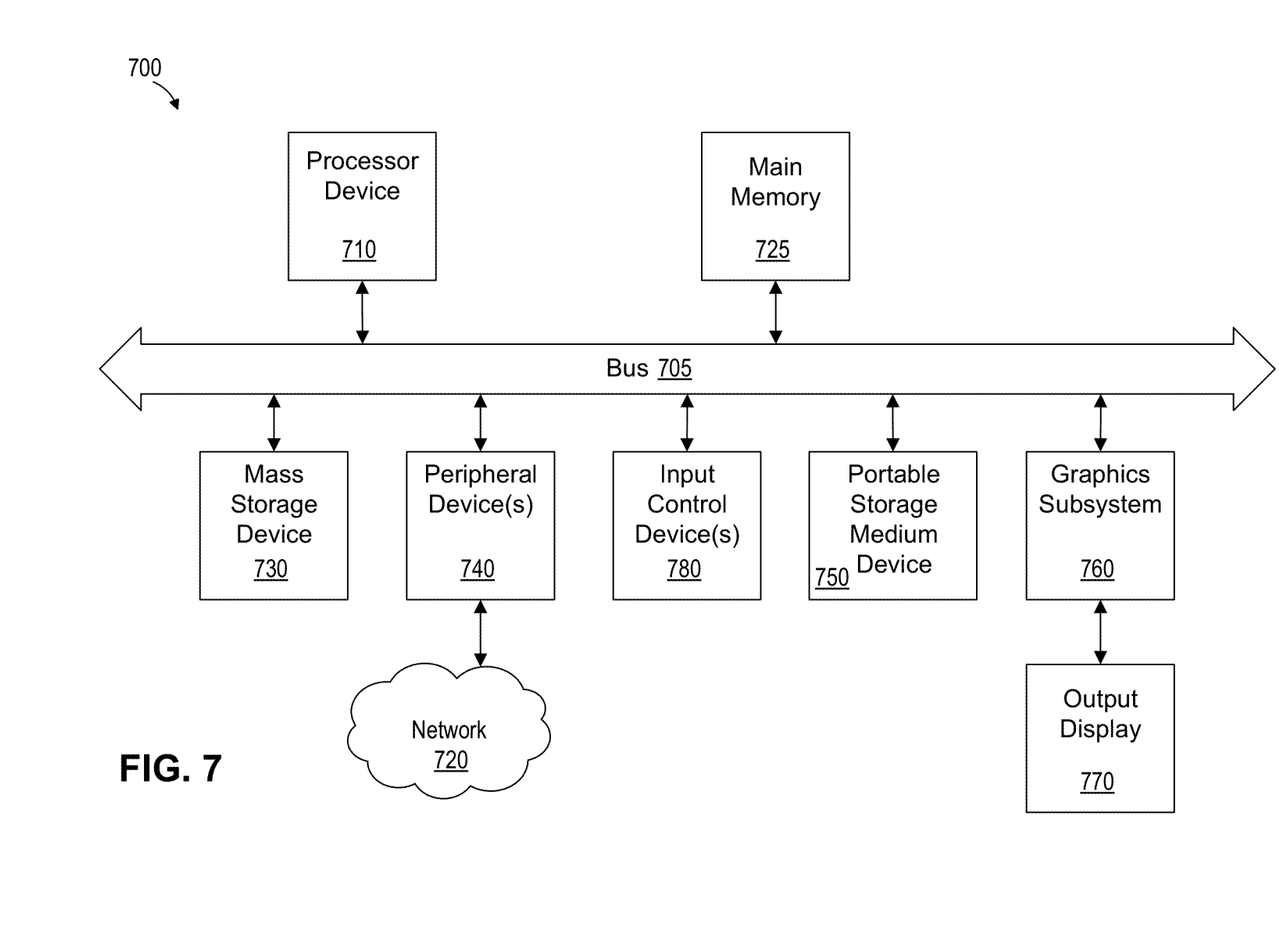
FIG. 7 is a block diagram of a general and/or special purpose computer, in accordance with some embodiments.

FIG. 7 is a high-level block diagram of a general and/or special purpose computer system 700, in accordance with some embodiments. The computer system 700 may be, for example, a user device, a user computer, a client computer and/or a server computer, among other things.

The computer system 700 preferably includes without limitation a processor device 710, a main memory 725, and an interconnect bus 705. The processor device 710 may include without limitation a single microprocessor, or may include a plurality of microprocessors for configuring the computer system 700 as a multi-processor system. The main memory 725 stores, among other things, instructions and/or data for execution by the processor device 710. The main memory 725 may include banks of dynamic random access memory (DRAM), as well as cache memory.

The computer system 700 may further include a mass storage device 730, peripheral device(s) 740, portable storage medium device(s) 750, input control device(s) 780, a graphics subsystem 760, and/or an output display 770. For explanatory purposes, all components in the computer system 700 are shown in FIG. 7 as being coupled via the bus 705. However, the computer system 700 is not so limited. Devices of the computer system 700 may be coupled through one or more data transport means. For example, the processor device 710 and/or the main memory 725 may be coupled via a local microprocessor bus. The mass storage device 730, peripheral device(s) 740, portable storage medium device(s) 750, and/or graphics subsystem 760 may be coupled via one or more input/output (I/O) buses. The mass storage device 730 is preferably a nonvolatile storage device for storing data and/or instructions for use by the processor device 710. The mass storage device 730 may be implemented, for example, with a magnetic disk drive or an optical disk drive. The mass storage device 730 is preferably configured for loading contents of the mass storage device 730 into the main memory 725.

The portable storage medium device 750 operates in conjunction with a nonvolatile portable storage medium, such as, for example, a compact disc read only memory (CD-ROM), to input and output data and code to and from the computer system 700. In some embodiments, the application may be stored on a portable storage medium, and may be inputted into the computer system 700 via the portable storage medium device 750. The peripheral device(s) 740 may include any type of computer support device, such as, for example, an input/output (I/O) interface configured to add additional functionality to the computer system 700. For example, the peripheral device(s) 740 may include a network interface card for interfacing the computer system 700 with a network 720.

The input control device(s) 780 provide a portion of the user interface for a user of the computer system 700. The input control device(s) 780 may include a keypad and/or a cursor control device. The keypad may be configured for inputting alphanumeric and/or other key information. The cursor control device may include, for example, a mouse, a trackball, a stylus, and/or cursor direction keys. In order to display textual and graphical information, the computer system 700 preferably includes the graphics subsystem 760 and the output display 770. The output display 770 may include a cathode ray tube (CRT) display and/or a liquid crystal display (LCD). The graphics subsystem 760 receives textual and graphical information, and processes the information for output to the output display 770.

Each component of the computer system 700 may represent a broad category of a computer component of a general and/or special purpose computer. Components of the computer system 700 are not limited to the specific implementations provided here.

Portions of the disclosure may be conveniently implemented by using a conventional general purpose computer, a specialized digital computer and/or a microprocessor programmed according to the teachings of the present disclosure, as will be apparent to those skilled in the computer art. Appropriate software coding may readily be prepared by skilled programmers based on the teachings of the present disclosure.

Some embodiments may also be implemented by the preparation of application-specific integrated circuits, field programmable gate arrays, or by interconnecting an appropriate network of conventional component circuits.

Some embodiments include a computer program product. The computer program product may be a non-transitory computer-readable storage medium or media having instructions stored thereon or therein which can be used to control, or cause, a computer to perform any of the processes of the disclosure. The computer-readable storage medium may include without limitation a floppy disk, a mini disk, an optical disc, a Blu-ray Disc, a DVD, a CD-ROM, a micro-drive, a magneto-optical disk, a ROM, a RAM, an EPROM, an EEPROM, a DRAM, a VRAM, a flash memory, a flash card, a magnetic card, an optical card, nanosystems, a molecular memory integrated circuit, a RAID, remote data storage/archive/warehousing, and/or any other type of device suitable for storing instructions and/or data.

Stored on any one of the computer readable storage medium or media, some implementations include software for controlling both the hardware of the general and/or special computer or microprocessor, and for enabling the computer or microprocessor to interact with a human user or other mechanism utilizing the results of the disclosure. Such software may include without limitation device drivers, operating systems, and user applications. Ultimately, such computer readable storage media further includes software for performing aspects of the disclosure, as described above.

Included in the programming and/or software of the general and/or special purpose computer or microprocessor are software modules for implementing the processes described above.

While various example embodiments of the present disclosure have been described above, it should be understood that they have been presented by way of example, and not limitation. It will be apparent to persons skilled in the relevant art(s) that various changes in form and detail can be made therein. Thus, the present disclosure should not be limited by any of the above described example embodiments, but should be defined only in accordance with the following claims and their equivalents.

In addition, it should be understood that the figures are presented for example purposes only. The architecture of the example embodiments presented herein is sufficiently flexible and configurable, such that it may be utilized and navigated in ways other than that shown in the accompanying figures.

Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

What is claimed is:

1. A method for associating resources in a communication system, comprising the steps of:
   storing, in a database, a model including a plurality of attributes corresponding to a plurality of respective sources and a plurality of respective communications applications,
   wherein the model is an aggregate of licensed models stored in the database in association with a user and licensed to the user, each licensed model corresponding to a different one of the plurality of communications applications;
   receiving a single query for information corresponding to at least one party from a client device, the query being received via a tear-off application instantiated based on the query;
   generating a plurality of requests for the plurality of sources based on the single query and the model, each of the plurality of requests being formatted in a different message format;
   transmitting the plurality of requests to the plurality of sources, respectively;
   receiving at least one result via the tear-off application responsive to the query from at least one of the plurality of sources, the at least one result including the information corresponding to the at least one party;
   identifying, from the plurality of communications applications, a communications application associated with the information included in the at least one result based on one of the plurality of attributes included in the model corresponding to the at least one of the plurality of sources;
   obtaining, from the identified communications application, a status of communications activity including an active communication session including the party and at least one other party using the identified communications application; and
   presenting the at least one result and the status of communications activity in a list via a graphical user interface of the tear-off application,
   wherein the at least one result, when selected, causes an actions window to be presented via the graphical user interface, the actions window including a list of actions that are associated with the at least one result and that are available for selection by the user, the list of actions including an action that is selectable by the user to cause the identified communications application to establish a communication path with the party, thereby causing the user to join the active communication session with the party and the other party, and
   wherein the list of actions available to the user are based on the licensed models stored in the database.

2. The method according to claim 1, further comprising the steps of:
   identifying a macro associated with the at least one result based on one of the plurality of attributes corresponding to the at least one of the plurality of sources; and
   presenting the macro in the list via the graphical user interface, the macro being selectable to cause the identified communications application to sequentially execute a plurality of commands to establish the communication path.

3. The method according to claim 2, wherein the plurality of commands includes dialing a telephone number and subsequently dialing a telephone extension.

4. The method according to claim 1, further comprising:
   searching across all horizontal layers of the selected number of models by using the model.

5. The method according to claim 1, wherein the plurality of attributes include both transient and persistent data.

6. A non-transitory computer-readable medium having stored thereon sequences of instructions, the sequences of instructions including instructions which, when executed by a computer system, cause the computer system to perform:
   storing, in a database, a model including a plurality of attributes corresponding to a plurality of respective sources and a plurality of respective communications applications,
   wherein the model is an aggregate of licensed models stored in the database in association with a user and licensed to the user, each licensed model corresponding to a different one of the plurality of communications applications;
   receiving a single query for information corresponding to at least one party from a client device, the query being received via a tear-off application instantiated based on the query;
   generating a plurality of requests for the plurality of sources based on the single query and the model, each of the plurality of requests being formatted in a different message format;
   transmitting the plurality of requests to the plurality of sources, respectively;
   receiving at least one result via the tear-off application responsive to the query from at least one of the plurality of sources, the at least one result including the information corresponding to the at least one party;
   identifying, from the plurality of communications applications, a communications application associated with the information included in the at least one result based on one of the plurality of attributes included in the model corresponding to the at least one of the plurality of sources;

obtaining, from the identified communications application, a status of communications activity including an active communication session including the party and at least one other party using the identified communications application; and presenting the at least one result and the status of communications activity in a list via a graphical user interface of the tear-off application, wherein the at least one result, when selected, causes an actions window to be presented via the graphical user interface, the actions window including a list of actions that are associated with the at least one result and that are available for selection by the user, the list of actions including an action that is selectable by the user to cause the identified communications application to establish a communication path with the party, thereby causing the user to join the active communication session with the party and the other party, and wherein the list of actions available to the user are based on the licensed models stored in the database.

7. The non-transitory computer-readable medium according to claim 6, further having stored thereon a sequence of instructions which when executed by the computer system causes the computer system to perform:

identifying a macro associated with the at least one result based on one of the plurality of attributes corresponding to the at least one of the plurality of sources; and presenting the macro in the list via the graphical user interface, the macro being selectable to cause the identified communications application to sequentially execute a plurality of commands to establish the communication path.

8. The computer-readable medium of claim 7, wherein the plurality of commands includes dialing a telephone number and subsequently dialing a telephone extension.

9. The computer-readable medium of claim 6, further having stored thereon a sequence of instructions which when executed by the computer system causes the computer system to perform:

searching across all horizontal layers of the selected number of models by using the model.

10. The non-transitory computer-readable medium according to claim 6, wherein the plurality of attributes include both transient and persistent data.

11. An apparatus for associating resources in a communication system, comprising:

at least one processor operable to perform:

storing, in a database, a model including a plurality of attributes corresponding to a plurality of respective sources and a plurality of respective communications applications, wherein the model is an aggregate of licensed models stored in the database in association with a user and licensed to the user, each licensed model corresponding to a different one of the plurality of communications applications;

receiving a single query for information corresponding to at least one party from a client device, the query being received via a tear-off application instantiated based on the query;

generating a plurality of requests for the plurality of sources based on the single query and the model, each of the plurality of requests being formatted in a different message format;

transmitting the plurality of requests to the plurality of sources, respectively;

receiving at least one result via the tear-off application responsive to the query from at least one of the plurality of sources, the at least one result including the information corresponding to the at least one party;

identifying, from the plurality of communications applications, a communications application associated with the information included in the at least one result based on one of the plurality of attributes included in the model corresponding to the at least one of the plurality of sources;

obtaining, from the identified communications application, a status of communications activity including an active communication session including the party and at least one other party using the identified communications application; and presenting the at least one result and the status of communications activity in a list via a graphical user interface of the tear-off application, wherein the at least one result, when selected, causes an actions window to be presented via the graphical user interface, the actions window including a list of actions that are associated with the at least one result and that are available for selection by the user, the list of actions including an action that is selectable by the user to cause the identified communications application to establish a communication path with the party, thereby causing the user to join the active communication session with the party and the other party, and wherein the list of actions available to the user are based on the licensed models stored in the database.

12. The apparatus according to claim 11, wherein the at least one processor is further operable to perform:

identifying a macro associated with the at least one result based on one of the plurality of attributes corresponding to the at least one of the plurality of sources; and presenting the macro in the list via the graphical user interface, the macro being selectable to cause the identified communications application to sequentially execute a plurality of commands to establish the communication path.

13. The apparatus according to claim 12, wherein the plurality of commands includes dialing a telephone number and subsequently dialing a telephone extension.

14. The apparatus according to claim 11, wherein the at least one processor is further operable to perform :

searching across all horizontal layers of the selected number of models by using the model.

15. The apparatus according to claim 11, wherein the plurality of attributes include both transient and persistent data.

16. The method according to claim 1, wherein the status of communications activity includes information about any one or a combination of an active call session, an active forum, an active conference, speaker activity, call volume, call statistics, and call session attributes.

17. The non-transitory computer-readable medium according to claim 6, wherein the status of communications activity includes information about any one or a combination of an active call session, an active forum, an active conference, speaker activity, call volume, call statistics, and call session attributes.

18. The apparatus according to claim 11, wherein the status of communications activity includes information about any one or a combination of an active call session, an active forum, an active conference, speaker activity, call volume, call statistics, and call session attributes.

* * * * *

UNITED STATES PATENT AND TRADEMARK OFFICE
CERTIFICATE OF CORRECTION

PATENT NO.         : 9,191,517 B2
APPLICATION NO.    : 12/953778
DATED              : November 17, 2015
INVENTOR(S)        : Brett Berkowitz et al.

It is certified that error appears in the above-identified patent and that said Letters Patent is hereby corrected as shown below:

In the Drawings

SHEET 1, FIGURE 1

"Media Geteway" should read -- Media Gateway --.

In the Specification

COLUMN 3
Line 4, "click to dial" should read -- click-to-dial --;
Line 66, "used" should read -- be used --.

COLUMN 5

Line 1, "instruct" should read -- instructs --.

COLUMN 8

Line 24, "click to dial," should read -- click-to-dial, --.

COLUMN 11

Line 3, "include" should read -- includes --.

COLUMN 12

Line 37, "include" should read -- includes--.

Signed and Sealed this
First Day of March, 2016

Michelle K. Lee
*Director of the United States Patent and Trademark Office*

CERTIFICATE OF CORRECTION (continued)
U.S. Pat. No. 9,191,517 B2

COLUMN 13

Line 21, "are" should read -- is --;
    Line 44, "include" should read -- includes --.

COLUMN 14

Line 29, "are" should read -- is --;
    Line 48, "include" should read -- includes --.